(12) United States Patent
Onishi et al.

(10) Patent No.: US 7,475,755 B2
(45) Date of Patent: Jan. 13, 2009

(54) ELECTRIC POWER STEERING DEVICE

(75) Inventors: Akira Onishi, Osaka (JP); Takashi Fuwa, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 322 days.

(21) Appl. No.: 10/577,474

(22) PCT Filed: Nov. 18, 2004

(86) PCT No.: PCT/JP2004/017520

§ 371 (c)(1),
(2), (4) Date: Apr. 27, 2006

(87) PCT Pub. No.: WO2005/049407

PCT Pub. Date: Jun. 2, 2005

(65) Prior Publication Data

US 2007/0107975 A1 May 17, 2007

(30) Foreign Application Priority Data

Nov. 18, 2003 (JP) .............................. 2003-388163

(51) Int. Cl.
*B62D 5/04* (2006.01)

(52) U.S. Cl. ..................................................... 180/444

(58) Field of Classification Search ................ 180/444, 180/443, 402; 310/68 B, 68 R
See application file for complete search history.

(56) References Cited

U.S. PATENT DOCUMENTS

| 5,555,951 | A | * | 9/1996 | Sugino et al. ............... 180/444 |
| 5,573,079 | A | * | 11/1996 | Suda et al. .................. 180/444 |
| 5,770,902 | A | * | 6/1998 | Batten et al. .................... 310/71 |
| 5,988,005 | A | * | 11/1999 | Onodera et al. .......... 74/388 PS |
| 6,268,669 | B1 | * | 7/2001 | Wakao et al. ............. 310/67 R |
| 6,944,906 | B2 | * | 9/2005 | Moein et al. ................ 15/250.3 |
| 7,243,569 | B2 | * | 7/2007 | Takahashi et al. ........ 74/388 PS |
| 2002/0144854 | A1 | | 10/2002 | Mielke et al. |
| 2007/0222330 | A1 | * | 9/2007 | Innami et al. ............... 310/259 |

FOREIGN PATENT DOCUMENTS

| EP | 1 344 709 A1 | 9/2003 |
| JP | 7-215226 | 8/1995 |
| JP | 2000-168592 | 6/2000 |
| JP | 2002-302053 | 10/2002 |
| JP | 2003-158856 | 5/2003 |
| JP | 2003-209992 | 7/2003 |

* cited by examiner

*Primary Examiner*—Tony H. Winner
(74) *Attorney, Agent, or Firm*—Oblon, Spivak, McClelland, Maier & Neustadt, P.C.

(57) ABSTRACT

An electric power steering device is provided which is excellent in the nature being mounted on a vehicle. The electric power steering device 1 comprises a rack shaft 20 constructed to be movable reciprocatively, a rack housing 10 receiving the rack shaft 20 therein, a sleeve 41 arranged coaxially around the rack shaft 20, a brushless motor 40 taking a generally cylindrical shape and constructed to rotate the sleeve 41, and a rotational angle sensor 50 constructed to detect the rotational angle of the brushless motor 40. The rack housing 10 has arranged thereon a power connecter 42 for supplying electric power to the brushless motor 40 and a sensor connecter 52 for outputting a detection signal of the rotational angle sensor 50. The power connecter 42 and the sensor connecter 52 are arranged to be shifted on the same side in the axial direction of the rack shaft 20 with respect to the brushless motor 40.

4 Claims, 3 Drawing Sheets

ELECTRIC POWER STEERING DEVICE

TECHNOLOGICAL FIELD

The present invention relates to an electric power steering device with a brushless motor arranged around a rack shaft in coaxial alignment.

BACKGROUND ART

Heretofore, for example, there has been an electric power steering device having a brushless motor which is arranged around a rack shaft in coaxial alignment.

Brushless motors are excellent in durability as well as in reliability because of being capable of eliminating mechanical electric contacts. On the other hand, for realization of smooth motor rotation, it is necessary to apply electricity to motor coils at respective timings each appropriate to the rotational angle.

Therefore, it is generally necessary for the aforementioned brushless motors to have a rotational angle sensor for detecting the rotational angle (refer to Japanese Unexamined, Published Patent Application No. 2003-158856 for example).

However, the prior art electric power steering device as aforementioned involves the following problem. That is, it is required to provide a sensor connecter containing output terminals for outputting a detection signal of the rotational angle sensor, in addition to a power connecter containing power terminals for supplying the brushless motor with drive power.

For example, where like the electric power steering device described in Japanese Unexamined, Published Patent Application No. 2003-158856, the power connecter and the sensor connecter are respectively arranged on the axial opposite sides of the brushless motor, it is required to secure in vehicle a mounting space which is axially long along the rack shaft.

Therefore, for those vehicles which cannot secure the axially long mounting space along the rack shaft, it was difficult to mount the electric power steering device as constructed above.

The present invention has been made to solve the problem involved in the prior art and is to provide an electric power steering device which is well-designed in the nature of being mounted onto vehicles.

DISCLOSURE OF THE INVENTION

The first invention resides in an electric power steering device having a rack shaft engaged with a steering pinion and constructed to be movable reciprocatively to follow rotational motion of the steering pinion; a rack housing receiving the rack shaft to be movable therein; a sleeve taking a generally cylindrical shape and arranged coaxially around the rack shaft through a ball screw mechanism formed externally of the rack shaft; a brushless motor taking a generally cylindrical shape, arranged almost coaxially between the rack housing and the sleeve and constructed to rotate the sleeve; and a rotational angle sensor received inside the rack housing and constructed to detect the rotational angle of the brushless motor, wherein the rack housing has arranged thereon a power connecter containing power terminals for supplying electric power to the brushless motor and a sensor connecter containing output terminals for outputting a detection signal of the rotational angle sensor and wherein the power connecter and the sensor connecter are arranged to be shifted on the same side in the axial direction of the rack shaft with respect to the brushless motor.

In the electric power steering device according to the present invention, the power connecter and the sensor connecter are arranged to be shifted on the same side in the axial direction of the rack shaft with respect to the brushless motor.

That is, in the electric power steering device, the foregoing two components which protrude relatively largely from the external surface of the rack housing are arranged to gather at almost the same places in the axial direction.

Thus, the electric power steering device can be mounted to the vehicle or the like which does not have any vacant space but only one place in the axial direction to face the external surface of the rack housing. Further, where the power connecter and the sensor connecter are arranged at similar places as aforementioned, it becomes possible for example to lay as a bundle vehicle-side harnesses to be connected to the respective connecters, so that the nature for such harness layout can be improved.

The second invention resides in the electric power steering device of the first invention, wherein the rack housing comprises a first rack housing receiving the brushless motor and the rotational angle sensor and having the power connecter and the sensor connecter secured thereto and a second rack housing connected to the first rack housing in the axial direction and wherein favorably, the rotational angle sensor, the power connecter and the sensor connecter which are secured to the first rack housing are arranged at respective places closer to the second rack housing than the brushless motor.

In this case, works for wirings between the brushless motor and the power connecter and between the rotational angle sensor and the sensor connecter can be done efficiently through the accesses from the side of an end of the first rack housing opening toward the second rack housing. Further, it becomes possible to obviate the necessity of carrying out the foregoing wiring works and the like from axial opposite end sides of the first rack housing as such would otherwise be required for example in the case where the power connecter and the sensor connecter are arranged with the brushless motor therebetween.

Therefore, in the electric power steering device as constructed above, the other end opposite to the second rack housing of the first rack housing can be utilized as an end portion for the whole rack housing, so that it can be realized to constitute the rack housing as a two-dividable structure composed of the first rack housing and the second rack housing.

By taking the two-dividable structure of the rack housing, it can be realized to sufficiently enhance the assembling accuracy in the receiving structure receiving the rack shaft in the rack housing, particularly in the assembling accuracy in the axial direction of the rack shaft which accuracy largely influences the alignment accuracy and the like of steered wheels.

Further, by taking the two-dividable structure of the rack housing, the assembling accuracy in the axial direction of the rack shaft can be improved compared with the structure of the rack housing taking a three or more dividable structure, so that it becomes possible to suppress the variation of a preload which is exerted on the ball screw mechanism, shaft support bearings or the like.

Therefore, in the electric power steering device, it becomes possible to suppress the probability that chatter or the like occurs between the sleeve and the rack shaft, and it also becomes possible to make the efficiency in transmitting the force from the brushless motor through the ball screw mechanism to the rack shaft meet the design specifications determined beforehand therefor.

Accordingly, the electric power steering device becomes one which is of the character capable of operating to meet the design specifications and which is thus less in the variation of property and excellent in quality.

The third invention resides in the electric power steering device of the first invention, wherein favorably, the sensor connecter and the power connecter are arranged on the external surface of the rack housing with an interval of more than 0 and less than 180 degrees in the circumferential direction.

Where the sensor connecter and the power connecter are arranged within the aforementioned angular range, the sensor connecter and the power connecter can be arranged to be compact in the axial direction while suppressing the probability for them to interfere with each other, so that it can be realized to downsize the body structure in the axial direction of the whole of the electric power steering device.

The fourth invention resides in the electric power steering device of the second invention, wherein favorably, the sensor connecter and the power connecter are arranged on the external surface of the rack housing with an interval of more than 0 and less than 180 degrees in the circumferential direction.

Where the sensor connecter and the power connecter are arranged within the aforementioned angular range, the sensor connecter and the power connecter can be arranged to be compact in the axial direction while suppressing the probability for them to interfere with each other, so that it can be realized to downsize the body structure in the axial direction of the whole of the electric power steering device.

PREFERRED EMBODIMENT TO PRACTICE THE INVENTION

Embodiment 1

Figure 1:
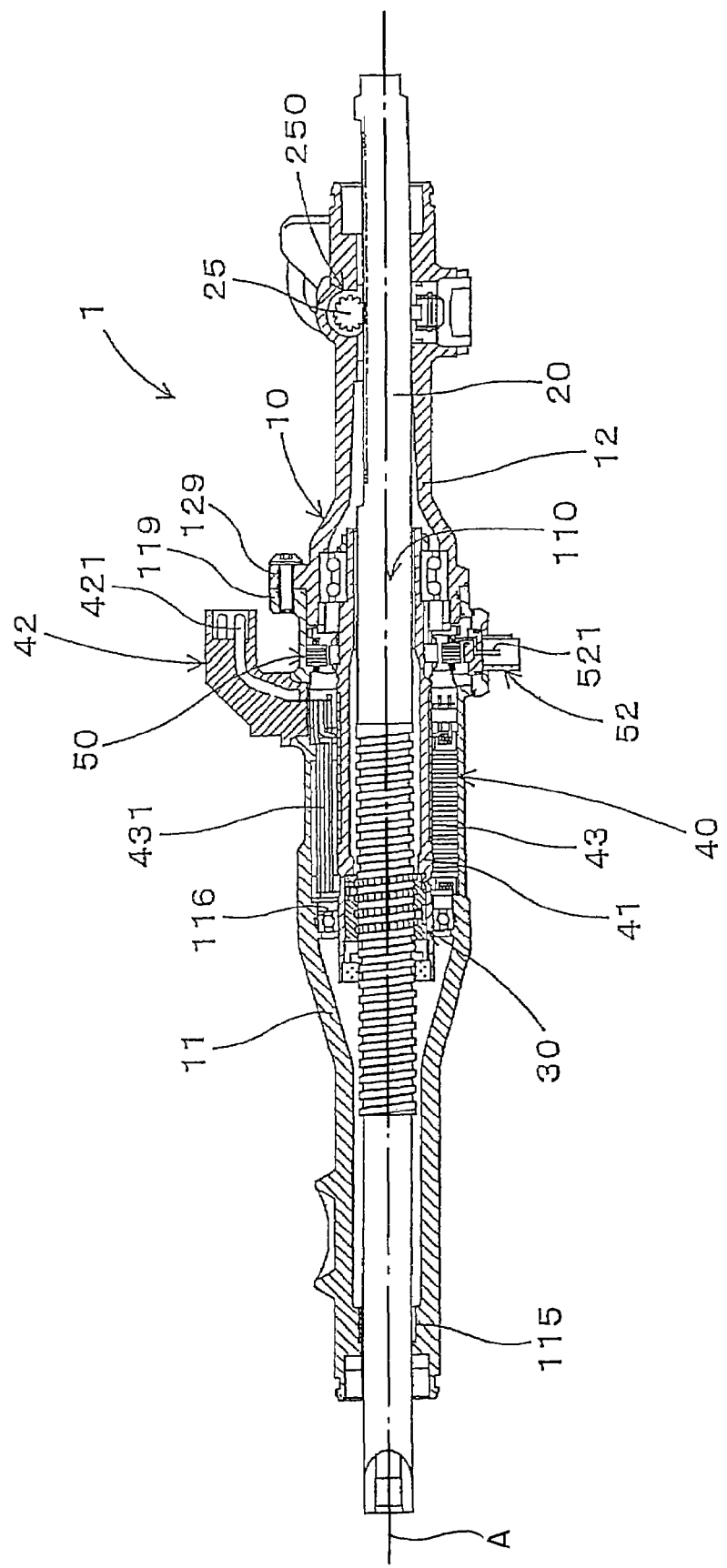
FIG. 1 is a sectional view showing the section structure of an electric power steering device in an embodiment 1.

The present embodiment is an example regarding an electric power steering device 1 having a rack housing 10 taking a two-dividable structure. The details of the present embodiment will be described with reference to FIGS. 1 and 2.

The electric power steering device 1 in the present embodiment is provided with a rack shaft 20 having an axis "A" and engaged with a steering pinion 25 and constructed to be movable reciprocatively to follow rotational motion of the steering pinion 25; a rack housing 10 receiving the rack shaft 20 to be movable therein; a sleeve 41 taking a generally cylindrical shape and arranged coaxially around the rack shaft 20 through a ball screw mechanism 30 formed externally of the rack shaft 20; a brushless motor 40 taking a generally cylindrical shape, arranged almost coaxially between the rack housing 10 and the sleeve 41 and constructed to rotate the sleeve 41; and a rotational angle sensor 50 received inside the rack housing 10 and constructed to detect the rotational angle of the brushless motor 40.

Further, the rack housing 10 has arranged thereon a power connecter 42 containing power terminals 421 for supplying electric power to the brushless motor 40 and a sensor connecter 52 containing output terminals 521 for outputting a detection signal of the rotational angle sensor 50. Here, the power connecter 42 and the sensor connecter 52 are arranged to be on the same side in the axial direction of the rack shaft 20 with respect to the brushless motor 40.

Hereafter, the details of this will be described fully.

As shown in FIG. 1, the electric power steering device 1 in the present embodiment is constructed to be bolt-secured to brackets (not shown) on the side of a vehicle through mounting portions (not shown) formed on the rack housing 10.

The rack housing 10 takes a two-dividable structure composed of a first rack housing 11 receiving the brushless motor 40 therein and a second rack housing 12 connected coaxially to an open end portion 110 in the axial direction of the first rack housing 11.

The rack housing 10 in the present embodiment is constructed to mutually face and to bolt-joint flange portions 119, 129 which are formed at axial end portions of the respective rack housings 11, 12.

As shown in the same figure, the first rack housing 11 and the second rack housing 12 takes a generally cylindrical shape as a whole in the state being assembled. Further, within the inside space, the rack shaft 20 is arranged in the state that it passes through the inside space and is movable reciprocatively in the axial direction. The rack shaft 20 is assembled in the rack housing 10 with itself being prevented from rotating about its axis. Further, opposite ends of the rack shaft 20 which passes through, and protrudes outside, the rack housing 10 are connected to left and right front wheels through tie rods (not shown).

Then, the rack shaft 20 in the present embodiment is connected to a steering wheel (not shown) through the steering pinion 25 disposed in the second rack housing 12. Further, an engaging section 250 of a well-known rack and pinion mechanism is formed between the rack shaft 20 and the steering pinion 25.

As shown in FIG. 1, the first rack housing 11 is constructed to have the brushless motor 40 and the rotational angle sensor 50 (hereafter referred to as resolver 50 for convenience) arranged therein to be adjacent to each other in the axial direction. In the first rack housing 11 in the present embodiment, the resolver 50 is arranged to be close to the side of the second rack housing 12.

The first rack housing 11 takes the shape of deflating or narrowing toward an end portion thereof opposite to the side of the second rack housing 12, and a generally cylindrical shaft bush 115 which slidably supports the rack shaft 20 is arranged on an internal surface of the end portion. Further, the first rack housing 11 has formed a support surface 116 into which a first bearing 61 for rotatably supporting the sleeve 41 is to be inserted, at an internal surface thereof close to the side of the shaft bush 115.

On the other hand, as shown in FIG. 1, the second rack housing 12 is constructed to receive the engaging section 250 between the steering pinion 25 and the rack shaft 20 in a portion close to its end portion opposite to the side of the first rack housing 11.

Figure 2:
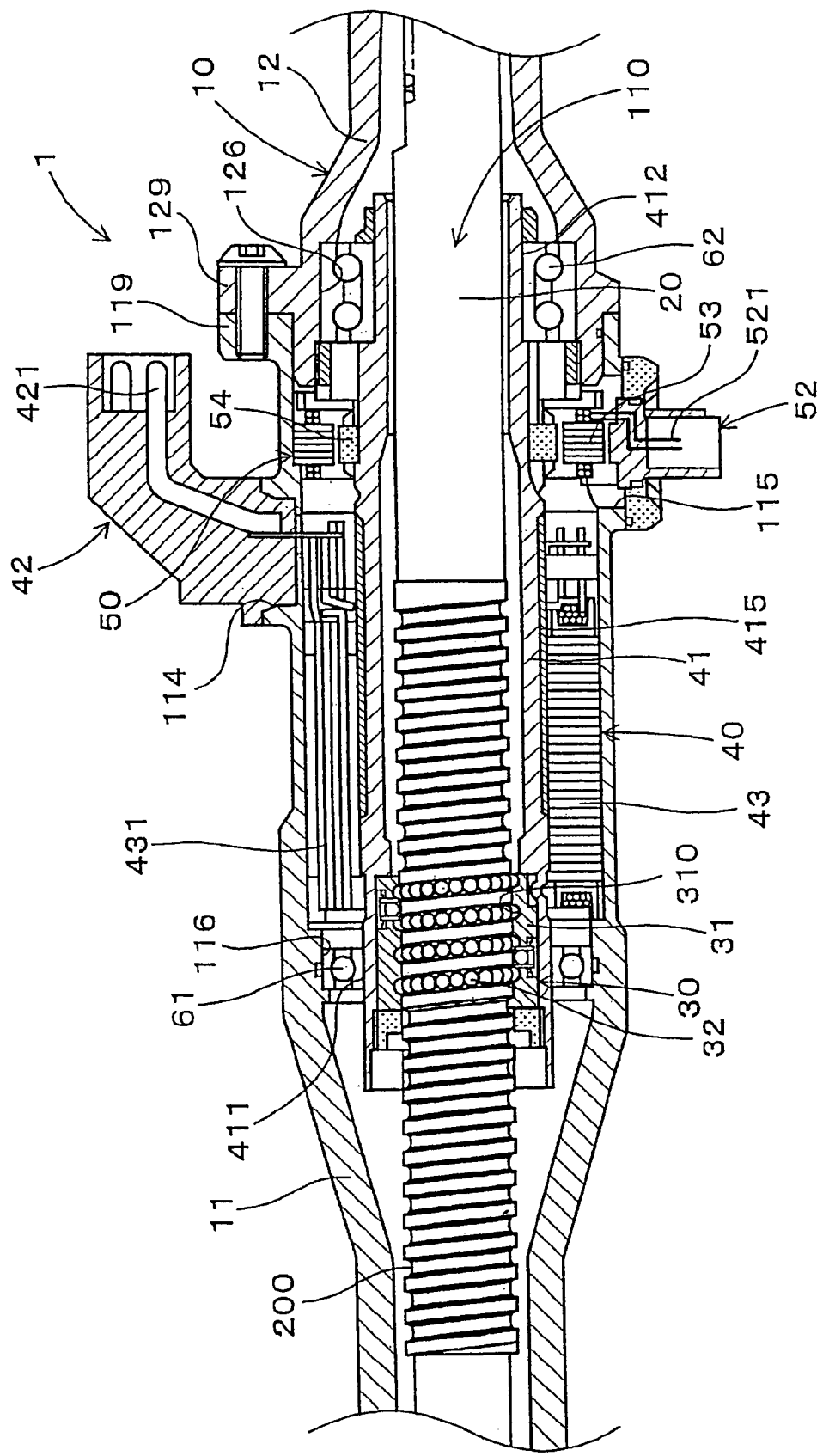
FIG. 2 is a sectional view showing the section structure of a power assist section in the embodiment 1.

Further, as shown in FIG. 2, the second rack housing 12 has a support surface 126 which fits on the external surface of a second bearing 62 rotatably carrying the sleeve 41, at an internal surface of an end portion thereof on the side of the flange portion 129.

As shown in FIG. 2, the brushless motor 40 is a motor having a drive stator 43 as motor stator with windings 431 arranged therearound and the sleeve 41 as motor rotor with permanent magnets arranged on its circumferential surface. In the present embodiment, the drive stator 43 is placed on the internal surface of the first rack housing 11 and then is fixedly fitted therein by a shrinkage fit process.

Furthermore, the first rack housing 11 has a connecter attaching hole 114 which is holed to secure the power connecter 42 containing electrode terminals 421. The connecter attaching hole 114 is holed to pierce through the external wall of the first rack housing 11. Then, terminal portions of the winding 431 wound on the drive stator 43 are welded to the power terminals 421. That is, the brushless motor 40 in the present embodiment is constructed to be supplied with driving power from outside via the electrode terminals 421 contained in the power connecter 42.

Further, as shown in FIG. 2, the resolver 50 is a sensor for detecting the rotational angle of the brushless motor 40. The resolver 50 is composed of a generally cylindrical detection stator 53 constituting a detection stator and a generally cylindrical detection rotor 54 which is formed to constitute a detection rotor and to be smaller in diameter than the internal surface of the detection stator 53.

Then, in the present embodiment, the detection stator 53 is fixedly fitted in the internal surface of the first rack housing 11. And, the detection rotor 54 is fixedly fitted on the external surface of the sleeve 41 to face the internal surface of the detection stator 53.

As shown in FIG. 2, the first rack housing 11 has a connecter attaching hole 115 holed therein for securing the sensor connecter 52 containing the output terminals 521. Likewise the connecter attaching hole 114, the connecter attaching hole 115 is holed to pierce through the external wall of the first rack housing 11. Then, terminal portions of the windings arranged on the detection stator 53 is welded and electrically connected to the output terminals 521.

On the first rack housing 11 in the present embodiment, as shown in FIG. 2, the connecter attaching hole 114 and the connecter attaching hole 115 are holed on the same side in the axial direction with respect to the layout position of the brushless motor 40.

That is, in the electric power steering device 1 in the present embodiment, the power connecter 42 and the sensor connecter 52 are arranged to be shifted on the same side in the axial direction with respect to the layout position of the brushless motor 40.

As shown in FIG. 2, the sleeve 41 is a member taking a cylindrical shape and is constructed to be arranged externally of the rack shaft 20 in coaxial alignment therewith. The sleeve 41 has a support portion 421 formed on the external surface at its end on the side of the steering pinion 25 (refer to FIG. 1). On the other hand, another support portion 411 larger in diameter than the support portion 412 is formed on the external surface of an end portion on the other side.

Then, the sleeve 41 is constructed to be rotatably supported inside the rack housing 10 through the first bearing 61 fitted on the support portion 411 and the second bearing 62 fitted on the support portion 412.

Here, the permanent magnets 415 are arranged on an external surface portion facing the drive stator 43 of the external surface of the sleeve 41, and the sleeve 41 is constructed to serve as the motor rotor of the brushless motor by itself. The sleeve 41 is constructed to generate a rotational torque about its axis when electricity is applied to the windings 431 of the drive stator 43.

As shown in FIG. 2, the internal surface of the support portion 411 of the sleeve 41 is constructed to coaxially arrange a ball screw nut 31 therein. The ball screw nut 31 has a spiral ball screw groove 310 formed at its internal surface and is a member constituting the ball screw mechanism 30 which engages the sleeve 41 with the rack shaft 20. On the other hand, a spiral ball screw groove 200 is provided on the external surface of the rack shaft 20 over a predetermined extent in the axial direction.

Then, a plurality of rolling balls 32 are arranged to be rolled in a space of approximately round in cross-section which is made by combining the ball screw groove 200 on the external surface of the rack shaft 20 with the ball screw groove 310 on the internal surface of the ball screw nut 31.

In this manner, as shown in the same figure, the ball screw mechanism 30 is formed between the rack shaft 20 and the sleeve 41. And, the ball screw mechanism 30 is constructed to translate the rotational torque of the sleeve 41 in the positive and negative-going directions into the driving force in the reciprocative movement of the rack shaft 20.

Further, the electric power steering device 1 in the present embodiment is constructed to utilize the driving force for the reciprocative movement translated as described above as an assist force for lightening the steering force on a steering wheel (not shown) connected to the steering pinion 25 (refer to FIG. 1).

As described above, the rack housing 11 in the present embodiment is constructed to dispose the resolver 50 in the neighborhood of the open end portion 110 side with respect to the brushless motor 40. Furthermore, the power connecter 42 for supplying drive power to the brushless motor 40 and the sensor connecter 52 for outputting the measured signal of the resolver 50 are attached closer to the open end position 110 side than the brushless motor 40.

With this construction, in the electric power steering device 1 in the present embodiment, the mountings of the brushless motor 40 and the resolver 50 inside the first rack housing 11 and the inside wiring works for the power connecter 421 and the sensor connecter 521 can all be efficiently carried out from the side of the open end portion 110 of the first rack housing 11.

Therefore, in the electric power steering device 1 in the present embodiment, the end portion opposite to the open end portion 110 of the first rack housing 11 can be formed to take a narrowing shape as an end portion of the whole rack housing 10. And therefore, it can be realized to constitute the rack housing 10 as one taking the two-dividable structure composed of the first rack housing 11 and the second rack housing 12.

Where the rack housing 10 takes the two-dividable structure like the electric power steering device 1, sufficient enhancement can be realized in the assembling accuracy of the structure which receives the rack shaft 20 in the rack housing 10, particularly in the assembling accuracy of the rack shaft 20 in the axial direction which accuracy largely influences the alignment of the steered wheels.

Further, where the rack housing 10 takes the two-dividable structure, the assembling accuracy of the rack shaft 20 in the axial direction can be enhanced as aforementioned, so that it is possible to suppress the variation of an axial preload which is exerted on the ball screw mechanism 30, the bearings 61, 62 and the like.

Therefore, in the electric power steering device 1 in the present embodiment, it is possible to suppress the probability that chatter or the like occurs between the sleeve 41 and the rack shaft 20 and to make the efficiency in transmitting the force from the brushless motor 40 through the ball screw mechanism 30 to the rack shaft 20 meet the design specifications determined beforehand.

Accordingly, the electric power steering device 1 becomes one which is capable of operating to meet the design specifications and which is less in the variation of property and excellent in quality.

Furthermore, where the two components like the power connecter 42 and the sensor connecter 52 which relatively largely protrude from the external of the rack housing 10 are disposed at almost the same places, the mounting can be realized onto, e.g., the vehicle or the like which does not have any vacant space but only one place in the axial direction to face the external surface of the rack housing 10. In addition, where the power connecter 42 and the sensor connecter 52 are disposed at similar places, it becomes possible for example to layout as a bundle vehicle-side harnesses to be connected to the respective connecters 42, 52, so that the nature for such harnesses layout can be improved.

COMPARED EXAMPLE 1

Figure 3:
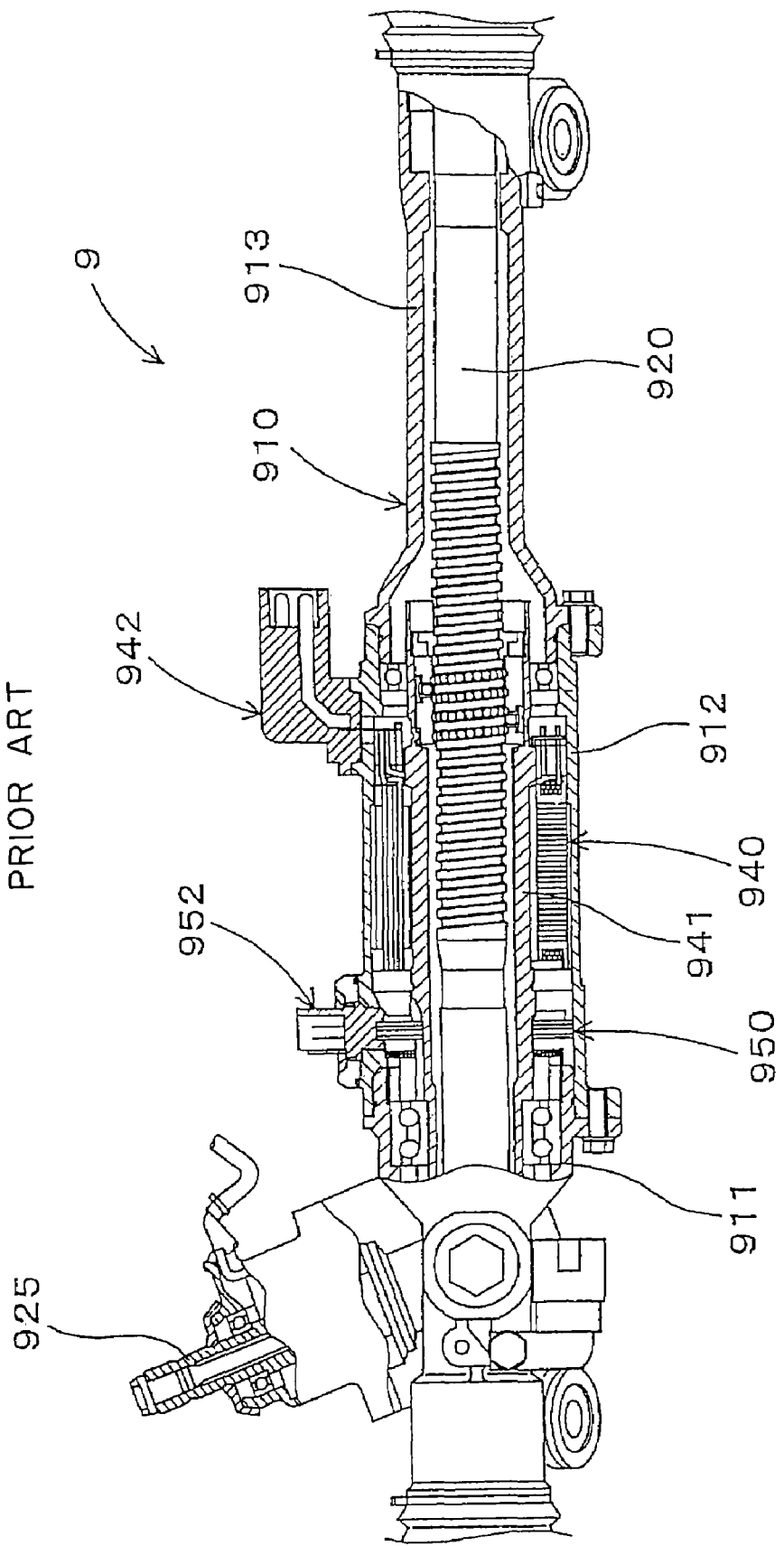
FIG. 3 is a sectional view showing the section structure of a prior art electric power steering device in a compared example 1.

This example is an example showing a prior art electric power steering device 9 wherein a sensor connecter 952 and a power connecter 942 are arranged at opposite sides in the axial direction of a brushless motor 940. The details of this example will be described with reference to FIG. 3.

A rack housing 910 in the example takes a three-dividable structure made by combining first to third rack housings 911 to 913. Then, the brushless motor 940 and a resolver 950 are received in the second rack housing 912 which is arranged at an intermediate portion between the first rack housing 911 and the third rack housing 913.

Further, in a similar manner to the foregoing first embodiment, a detection signal of the resolver 950 is outputted through output terminals contained in the sensor connecter 952, while electric power is supplied to the brushless motor 940 through power terminals contained in the power connecter 942.

In the electric power steering device in this example, the sensor connecter 952 and the power connecter 942 are arranged on the second rack housing 912 to have the brushless motor 940 therebetween in the axial direction.

With this construction, prior to welding the power terminals to the winding ends of the brushless motor 940 and prior to welding the output terminals to the winding ends of the resolver 950, wiring works have to be done from opposite sides of the second housing 912 containing the brushless motor 940 therein. Thus, in the second rack housing 912 of the present example, it is required to form open portions to which other rack housings 911, 913 are to be jointed, at opposite ends thereof in the axial direction.

Other constructions are the same as those in the embodiment 1.

INDUSTRIAL APPLICABILITY

The electric power steering device according to the present invention is suitable to be applied to a steering system for transmitting the rotation of a handle of a motor car to wheels.

The invention claimed is:

1. An electric power steering device comprising:
   a rack shaft engaged with a steering pinion and constructed to be movable reciprocatively to follow rotational motion of the steering pinion;
   a rack housing receiving the rack shaft to be movable therein;
   a sleeve taking a generally cylindrical shape and arranged coaxially around the rack shaft through a ball screw mechanism formed externally of the rack shaft;
   a brushless motor taking a generally cylindrical shape, arranged almost coaxially between the rack housing and the sleeve and constructed to rotate the sleeve; and
   a rotational angle sensor received inside the rack housing and constructed to detect the rotational angle of the brushless motor,
   wherein the rack housing has arranged thereon a power connecter containing power terminals for supplying electric power to the brushless motor and a sensor connecter containing output terminals for outputting a detection signal of the rotational angle sensor, and wherein the power connecter and the sensor connecter are arranged to be on the same side in the axial direction of the rack shaft with respect to the brushless motor.

2. The electric power steering device as set forth in claim 1, wherein the rack housing comprises a first rack housing receiving the brushless motor and the rotational angle sensor therein and securing the power connecter and the sensor connecter thereto and a second rack housing connected to the first rack housing in the axial direction and wherein the rotational angle sensor, the power connecter and the sensor connecter which are secured to the first rack housing are arranged at respective places closer to the second rack housing than the brushless motor.

3. The electric power steering device as set forth in claim 2, wherein the sensor connecter and the power connecter are arranged on the external surface of the rack housing with an interval of more than 0 and less than 180 degrees in the circumferential direction.

4. The electric power steering device as set forth in claim 1, wherein the sensor connecter and the power connecter are arranged on the external surface of the rack housing with an interval of more than 0 and less than 180 degrees in the circumferential direction.

* * * * *